(12) United States Patent  
Pedersen

(10) Patent No.: US 8,157,308 B2
(45) Date of Patent: Apr. 17, 2012

(54) GRIPPING DEVICE FOR A ROBOT

(75) Inventor: Bjørn Heide Pedersen, Randers (DK)

(73) Assignee: Scanvaegt International A/S, Aarhus N (DK)

( * ) Notice: Subject to any disclaimer, the term of this patent is extended or adjusted under 35 U.S.C. 154(b) by 0 days.

(21) Appl. No.: 12/675,805

(22) PCT Filed: Aug. 28, 2008

(86) PCT No.: PCT/DK2008/000308
§ 371 (c)(1),
(2), (4) Date: Apr. 8, 2010

(87) PCT Pub. No.: WO2009/026925
PCT Pub. Date: Mar. 5, 2009

(65) Prior Publication Data
US 2010/0215473 A1    Aug. 26, 2010

(30) Foreign Application Priority Data

Aug. 28, 2007 (DK) .................... 2007 01224

(51) Int. Cl.
*B65G 47/90* (2006.01)
*B65G 47/74* (2006.01)
(52) U.S. Cl. ........................ 294/213; 294/106
(58) Field of Classification Search ................ 294/86.4, 294/213, 106, 113, 103.1; 414/731; 901/30, 901/31, 36, 39
See application file for complete search history.

(56) References Cited

U.S. PATENT DOCUMENTS

| 1,298,064 | A |   | 3/1919 | Lichtenthaeler |
| 5,398,983 | A | * | 3/1995 | Ahrens ................. 294/106 |
| 5,562,386 | A |   | 10/1996 | Browning |

FOREIGN PATENT DOCUMENTS

| EP | 1792831 A1 | 11/2005 |
| GB | 2317157 A | 3/1998 |
| SU | 1335452 A1 | 9/1987 |
| WO | 0122043 A2 | 3/2001 |
| WO | 2005002797 A1 | 1/2005 |
| WO | 2006061024 A1 | 6/2006 |
| WO | 2007093774 A1 | 8/2007 |
| WO | 2007134603 A1 | 11/2007 |
| WO | 2008135720 A1 | 11/2008 |

OTHER PUBLICATIONS

International Search Report for Appl. Serial No. PCT/DK2008/000308 dated Nov. 25, 2008.

* cited by examiner

*Primary Examiner* — Paul T Chin
(74) *Attorney, Agent, or Firm* — Pearne & Gordon LLP

(57) ABSTRACT

A gripping device arranged for gripping an article 44, such as a food article, in particular a piece of meat, said gripping device 1 comprising at least two gripping parts 5, 7 pivotally suspended with respect to each other. At least one of the gripping parts 5, 7 is pivotally suspended and comprises a gripping arm 4, 6 and a gripping clamp 12, 14, wherein the gripping arm 4, 6 is adapted for carrying the gripping clamp 12, 14. The gripping device 1 further comprises a flexible belt-shaped material 20, which extends at least between lower parts of the at least two gripping parts.

20 Claims, 8 Drawing Sheets

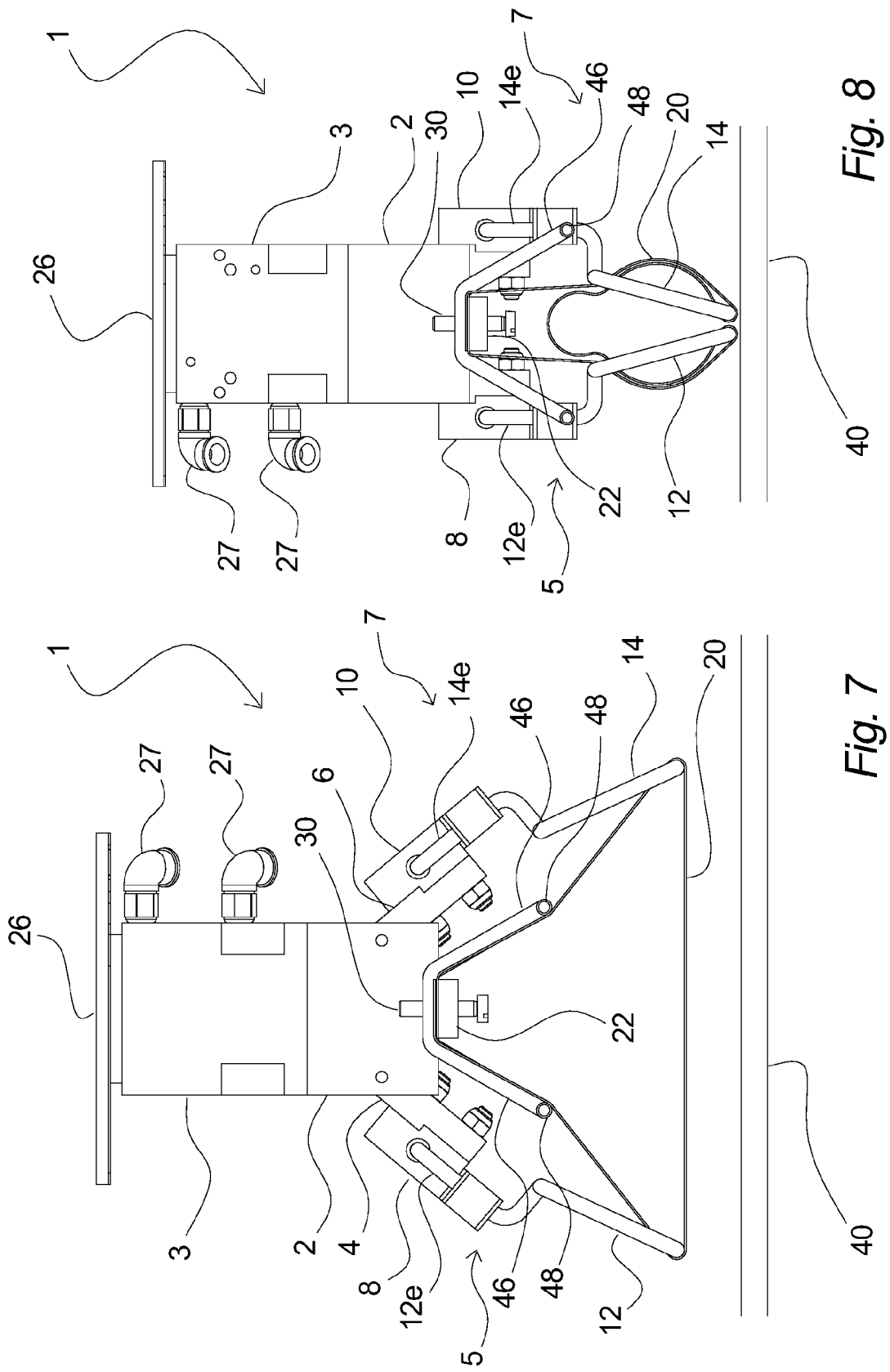

US 8,157,308 B2

GRIPPING DEVICE FOR A ROBOT

FIELD OF THE INVENTION

Figure 1:
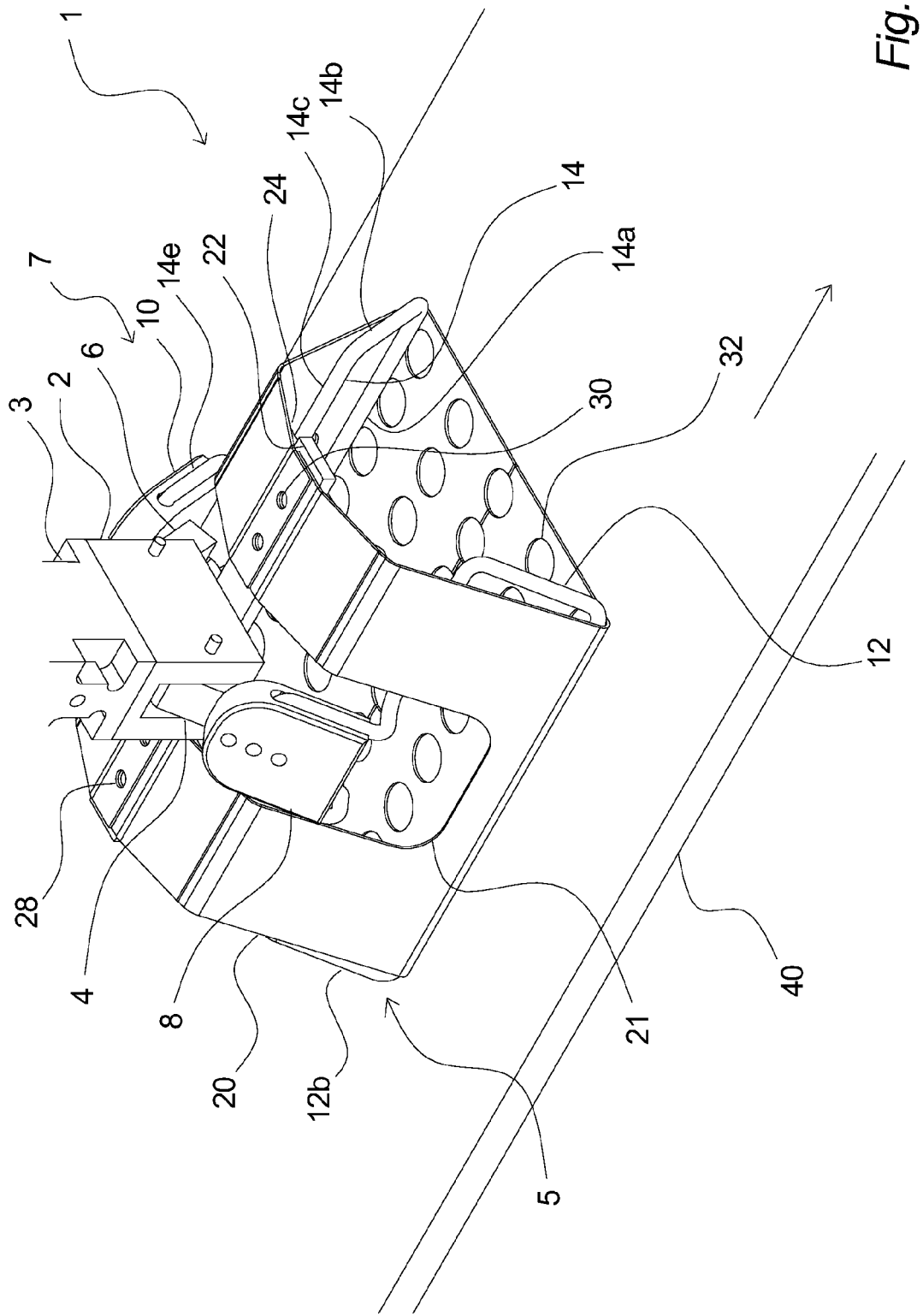

The invention relates to a gripping device arranged for gripping an article, such as a food article, in particular a piece of meat, and for delivering it again.

Further, the invention relates to a method of using such a gripping device, wherein a selected article is gripped and moved to a selected location.

BACKGROUND OF THE INVENTION

EP 1 792 831 A1 discloses a gripper for use in connection with handling of food articles which gripper has two jaws or blades by which an article is gripped, which article is to be moved from a conveyor to a selected position. The jaws or blades are arranged so as they grip an article, this will be pushed upwards between the jaws or blades. Further, this gripper exhibits a mechanical ejector for ejecting the article, as the jaws or blades are opened, which ejector serves to overcome a possible sticking of the article to the jaws or blades. The ejector thereby also contributes in controlling where the article is placed.

Further, WO 2007/093774 A1 discloses different embodiments of grippers wherein a flexible belt is used together with gripping arms for handling an article that is being gripped from a conveyor belt. For these embodiments, the flexible belt is arranged in such a manner that both ends are fixed on each side of two gripping arms. These two gripping arms are arranged for transversal displacement with respect to each other as they can be displaced on a horizontal rod. Thus the belt is guided below these two gripping arms. In use the total gripping arrangement is lowered over an article so that the ends of the gripping arms are positioned on each side of the article and close to the conveyor, and so that the flexible belt extends over the article in this spacing. Then the two gripping arms are moved towards each other so that the ends of the two gripping arms together with the flexible belt folding around the ends of the two gripping arms, is moved in between the conveyor and the article, whereby the flexible belt enwraps partly around the article. For these embodiments there are more parts involved, which parts are also displaced along the horizontal rod. One particular embodiment exhibits two additional arms included in the gripping arrangement, and another particular embodiment exhibits parts on which the ends of the flexible belt is fixed, and which contribute in controlling the flexible belt, for example the tightening of the belt and the length of the belt extending between the ends of the two gripping arms.

It is an object of the invention to provide an improved gripping device.

Further, it is an object of the invention to provide a gripping device having an improved efficiency, precision and processing speed.

Furthermore, it is an object of the invention to provide a gripping device which is flexible in use, and which exhibits improved advantages as regards hygienic conditions.

Moreover, it is an object of the invention to provide an improved method, whereby a selected article is gripped and moved to a selected location.

These and other advantages of the invention will be further explained in the following.

THE INVENTION

The invention relates to a gripping device arranged for gripping an article, such as a food article, in particular a piece of meat, said gripping device comprising at least two gripping parts, which are pivotally suspended with respect to each other, and a flexible belt-shaped material, extending at least between lower parts of said at least two gripping parts, wherein at least one of said gripping parts is pivotally suspended and comprises a gripping arm and a gripping clamp, wherein said gripping arm is adapted for carrying said gripping clamp.

Hereby, a number of advantages are obtained with respect to the prior art, including a relative simple construction of the gripping device and a structure allowing an automatic adjustment of the gripping device to the size and shape of the article. Also, it is achieved that the gripping device is not sensitive as regards the height or the level above e.g. a support surface such as for example a conveyor belt, upon which the article is located, since for example the gripping device will be able to enclose as much as possible around the article, for example until the support surface is contacted, and after which it can enclose further around the article as the gripping device is lifted upwards. This also entails an improved operating speed of the gripping device. Further advantages are obtained by using a gripping clamp, including a reduced weight, but moreover also that the flexible belt-shaped material can adapt relatively freely to the shape of the gripped article, not just in the direction of the width/height, but also in the longitudinal direction of the article.

The gripping clamp may be configured in a wide variety of forms and using a wide variety of materials, whereby a suitable flexibility can be achieved as well as a desired low weight, which is essential in view of a desired high speed of operation. Furthermore, the resiliency and flexibility of the gripping device also facilitates the reduced sensitivity, when operating the gripping device, as regards the height or the level above e.g. a support surface such as for example a conveyor belt.

The gripping device according to the invention may be used in connection with apparatus and methods using robot technique of the type disclosed in e.g. WO 01/22043, WO 2006/061024 and WO 2007/134603.

It should be noted that above and in the following terms such as height, level, above, below, vertical, horizontal, etc. have been used when explaining the embodiments according to the invention. It should be understood that these terms are related to a gripping device used for gripping and lifting an article that is carried by an essentially horizontal support as illustrated in the figures. However, it will be understood that variations hereof, e.g. as regards the vertical and/or horizontal directions will be within the scope of the present invention.

Expediently, both at least two gripping parts can be pivotally suspended.

Preferably, the gripping device may comprise a base part carrying said at least two gripping parts, and on which at least one of said gripping parts is pivotally suspended.

Hereby, a relatively easy and simple assembling of the gripping device is obtained, for example on a robot.

According to an advantageous embodiment, a gripping arm can have an adaptor mounted which adaptor is arranged to carry said gripping clamp.

Hereby, it is obtained that a gripping clamp easily can be mounted on a given gripping arm, said adaptor being adaptable to the given conditions, and whereby gripping clamps may be exchanged with ease.

Advantageously, the lower part of said gripping clamp may constitute said lower parts of said at least two gripping parts.

Hereby, a relatively simple construction is obtained, allowing a low weight of the movable parts in the gripping device, and which at the same time makes allowance for the flexible belt-shaped material being controlled effectively by the gripping device.

Expediently, said gripping clamp may comprise mounting parts arranged to engage with a gripping arm or engage with an adaptor mounted thereon.

According to an advantageous embodiment, the mounting parts can be formed resiliently.

Hereby, a particularly easy and effective way is obtained by which a gripping clamp can be mounted or dismounted.

Preferably, said gripping clamp may comprise a connection part which contributes a lateral displacement between the lower part of the gripping clamp and the corresponding gripping arm.

Hereby, increased resilient properties for the gripping clamp can be obtained, for example so that the gripping clamp can flex in the direction from the lower part to the mounting part.

According to a further advantageous embodiment, said flexible belt-shaped material can be arranged with two ends which can be mounted on the gripping device, for example on a mounting slat arranged on the base part.

Hereby, a simple way is obtained, whereby the flexible belt-shaped material can be mounted on the gripping device.

According to a further advantageous embodiment, said flexible belt-shaped material can be arranged as an endless part, which can be mounted on the gripping device, for example fixed to a mounting slat arranged on the base part.

Advantageously, said flexible belt-shaped material can be mounted on the gripping device, for example on said mounting slat by means of releasable mounting means.

Hereby, a particularly simple way is obtained whereby the flexible belt-shaped material can be mounted and dismounted again, for example with reference to cleaning and replacement.

Furthermore, said flexible belt-shaped material may be mounted on the gripping device so that it forms a substantially U-shape with the lower part of which extending between lower parts of said at least two gripping parts.

Hereby, it is understood that the flexible belt-shaped material not necessarily needs to meet end-to-end, but that it is sufficient that it extends upwards to a certain height along the gripping arms/gripping clamps.

According to still an advantageous embodiment, the gripping device may comprise resilient parts which affect the flexible belt-shaped material.

Hereby, in an expedient way, a control of the flexible belt-shaped material can be obtained, as the gripping arms/gripping clamps are moved so that there is no need for separate means to strain and/or regulate the length of the belt-shaped material, as is the case for the prior art technique disclosed in the above-mentioned WO 2007/093774 A1, which require a number of components to regulate the length of the belt-shaped material during the operation.

Expediently, said resilient parts affecting the flexible belt-shaped material can be formed as a leaf spring or similar arranged on said base part, for example connected to a mounting slat.

Furthermore, said resilient parts affecting the flexible belt-shaped material can be constituted wholly or partly by one or more gripping clamps formed with resilient properties.

Expediently, said resilient parts affecting the flexible belt-shaped material can be constituted wholly or partly by an actuator arranged to move said gripping parts, for example a pneumatic actuator formed with resilient properties.

Further, said resilient parts affecting the flexible belt-shaped material can be constituted wholly or partly by the inherent resilient properties of the flexible belt-shaped material.

Thus, a belt-shaped material having certain elastic properties in e.g. the direction of the length of the material can provide wholly or partly the desired resiliency.

Instead or in addition, the gripping device may comprise fixed means, for example a bracket or similar means, for affecting the flexible belt-shaped material, which fixed means can be adapted for interacting with the flexible belt-shaped material.

Hereby, it is achieved that for at least some positions of the gripping arms, where the belt-shaped material tends to be slackened, the belt-shaped material will be controlled by the fixed means, e.g. by having the fixed means contacting the belt-shaped material and taking up the slack. It will be apparent to a skilled person that such an arrangement can be combined with resilient means for controlling the belt-shaped material during the operation of the gripping device.

According to still an advantageous embodiment, said flexible belt-shaped material can be formed with recesses substantially corresponding to the position of gripping arms and optional adaptors.

Hereby, a particular simple and compact construction is obtained, whereby e.g. also the exchange of gripping belts is facilitated Expediently, said flexible belt-shaped material can be formed with holes or similar, for example uniformly distributed at least in a part of the region of the material which extends between said lower parts of said at least two gripping parts.

Hereby, it is avoided that an article excessively adheres to the belt-shaped material, which implies that a gripped article can be delivered easier, faster and more precise. Furthermore, it is also achieved that an article can be enwrapped with a relatively high speed, since air caught between the belt-shaped material and the article can escape through the holes. Thus, a high process speed can be achieved, and in addition it is ensured that the article is securely gripped.

Advantageously, said flexible belt-shaped material is constituted by a plurality of articles, for example parallel, belt-shaped articles, chain-formed band- or tape-formed articles, etc.

Expediently, two or more gripping parts, for example gripping clamps, can be arranged on at least one side of the gripping device and optionally on both sides.

Hereby, it can be considered that the articles can vary in width dimensions along their lengths, for example the different gripping parts being adjustable according to the actual dimension.

According to a particular embodiment, the gripping device and said flexible belt-shaped material can be formed so that said flexible belt-shaped material is replaceable, and where different sizes and/or types of said belt-shaped material can be used.

According to a further advantageous embodiment, the gripping parts may comprise parts which maintain or fix a gripped article in the longitudinal directions, for example in form of end parts on gripping clamps.

Hereby it can be ensured that an article is maintained in the gripping device, even if being processed at considerable rates of speed, including pivoting speeds which otherwise would affect an article to slide out of the grip.

Also, the invention relates to an apparatus for gripping and moving articles, optionally selectively, which apparatus comprises an automated device of the robot type on which a gripping device is mounted.

According to an advantageous embodiment, said automated device of the robot type can be arranged so that the gripping device can be lifted and lowered and moved in a horizontal plane, and so that the gripping device can be pivoted around one or more axes.

The invention also relates to a method of using a gripping device wherein the gripping device
  a) is guided towards a selected article, for example an article carried on a conveyor belt,
  b) is lowered down towards the article while gripping parts during at least part of this movement are moved apart so that the flexible belt-shaped material is substantially spread out,
  c) the gripping parts are starting to be moved towards each other while being lowered down, for example as the gripping device is located at a suitable height above the conveyor belt and/or the article, or after having been lowered down,
  d) the gripping device is lifted upwards with the gripping parts moved together with the flexible belt-shaped material having gripped around the article,
  e) the gripping device is carried to a selected location for delivering the article, and
  f) the gripping parts are starting being moved away from each other whereby the grip around the article is released and whereby the flexible belt-shaped material is starting being extended or stretched out between the gripping parts so that the article is affected in a direction away from the gripping device.

Hereby, a large number of advantages are obtained compared with prior art methods, including an increased flexibility, and conditions that allows a relatively simple construction of the gripping device. Further, a construction can be used allowing an automated adjustment of the gripping device to size and shape of the article. Furthermore, a reduced sensitivity—or in other words an increased tolerance—to height can be obtained by the method, for example as regards the actual time, the gripping parts are initiating the closing movement of step c. The closing movement can be started while the gripping device is being lowered, for example in a suitable distance above the article or the conveyor, which closing movement may be continued when the lowering of the gripping device is stopped. The gripping device is thus able to enclose as much as possible around the article, until the support surface is hit or contacted, for example, after which it can enclose further around the article, for example also when the gripping device is being lifted upwards. Also, the closing movement can be started at or after the lower position of the gripping device has been reached, for example when the gripping parts has reached or contacted the conveyor belt. The tolerance as regards the height of the gripping device in relation to the support, e.g. the conveyor belt, is also facilitated by the resiliency or flexibility of the gripping device, e.g. a resiliency provided by the structure and/or material of the gripping clamps, by the actuator or by other means, whereby it is made possible for the e.g. gripping clamps to contact the conveyor belt, even when the closing movement is performed, without any damage or other negative effect being created. Thus, certain tolerances in the control of a robot that is carrying the gripping device can be accepted in the vertical direction without having any negative effect on the reliability of the gripping device, e.g. the articles will be gripped or picked-up with great efficiency and preciseness, and neither the gripping device nor the robot itself will be negatively affected or harmed, if the gripping device, e.g. the gripping clamps, should be forced against e.g. the conveyor belt. Thus, also due to this tolerance, an increased operation speed can be achieved when using the gripping device and the method according to the invention. It should also be mentioned that an article can be securely gripped even though the gripping device is not lowered to a position, where the lower parts of the gripping clamps sweeps along the surface of the conveyor belt, as long as the lower parts of the gripping clamps may contact the article at a certain height, depending on e.g. the thickness and/or other characteristics of the article.

Expediently, step c may be started while the gripping device is at a substantially stationary height above the conveyor belt.

Alternatively, step c may be started while the gripping device is starting being lifted upwards with respect to the conveyor.

Hereby, an increased processing speed, flexibility and precision can be obtained because a compensation for the downward going movement of the lower parts of the gripping parts can be obtained by the upward going movement of the gripping device during their pivoting so that the lower parts of the gripping parts can maintain an essentially horizontal level during part of the movement and possibly in such a manner that they may sweep along the support surface or not even contact or hit against the support surface.

Expediently, in step c the gripping device can be lowered down to a distance of the conveyor, wherein the flexible belt-shaped material is in touch with the article.

Thereby the flexible belt-shaped material can gradually adapt to the shape of the article, i.e. enwrapping of the article can be initiated in this step already.

According to an advantageous embodiment, in step c, the flexible belt-shaped material can be made to enwrap a part of the article so that the shape of the article is partially affected thereby.

According to a still further embodiment, in step f, the flexible belt-shaped material may gradually be released from the article from each side thereof so that an possible adhesion between the article and the flexible belt-shaped material is gradually neutralized.

Hereby, an effective, quick and precise delivery of a gripped article can be obtained.

According to a further advantageous embodiment, the angular orientation of the gripping device with respect to the selected article can be controlled in connection with step a and/or b.

According to a further advantageous embodiment, the angular orientation of the gripping device with respect to the selected location for delivery of the article can be controlled in connection with step e and/or f.

THE FIGURES

Figure 2:
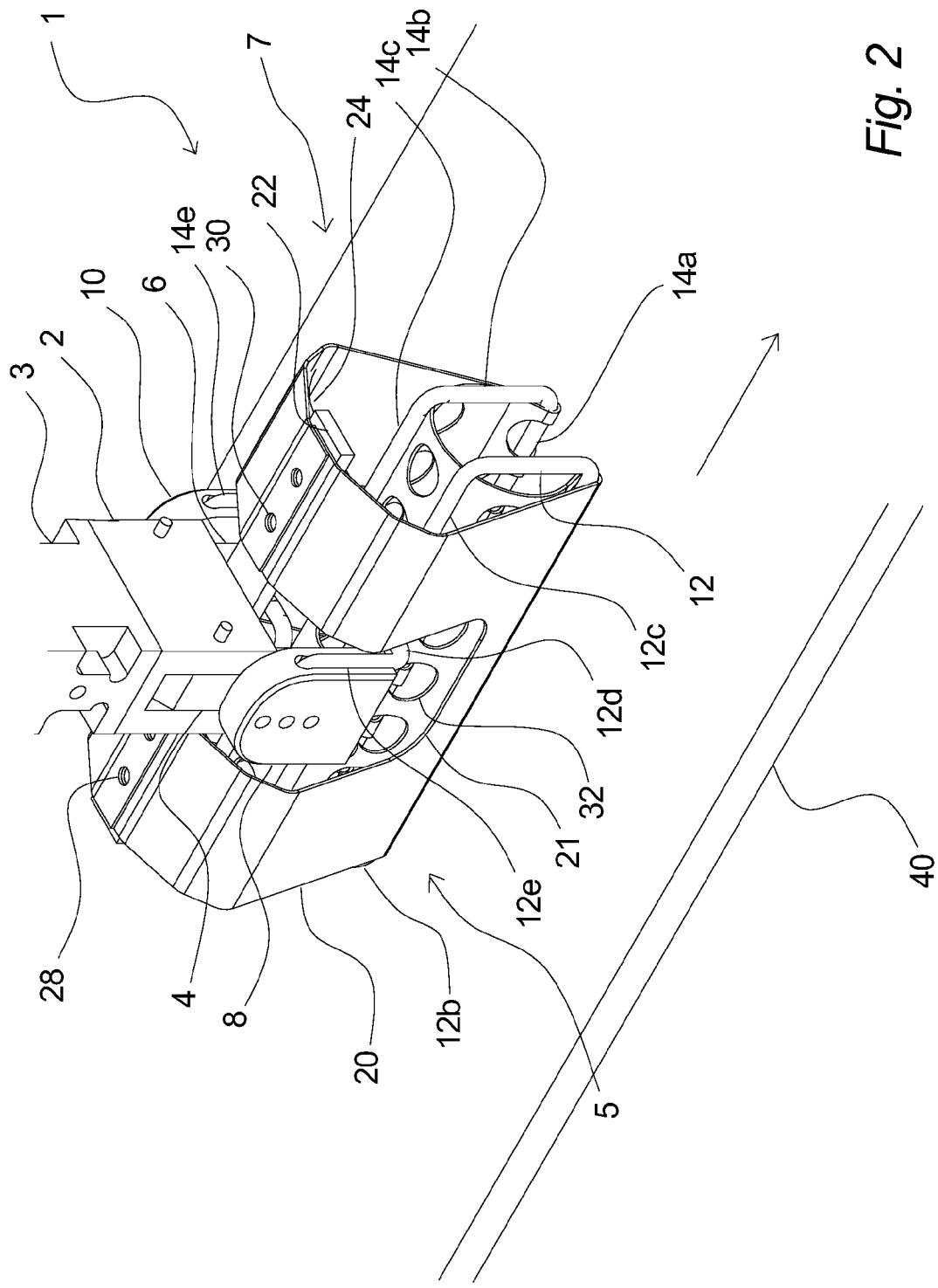
Figure 3:
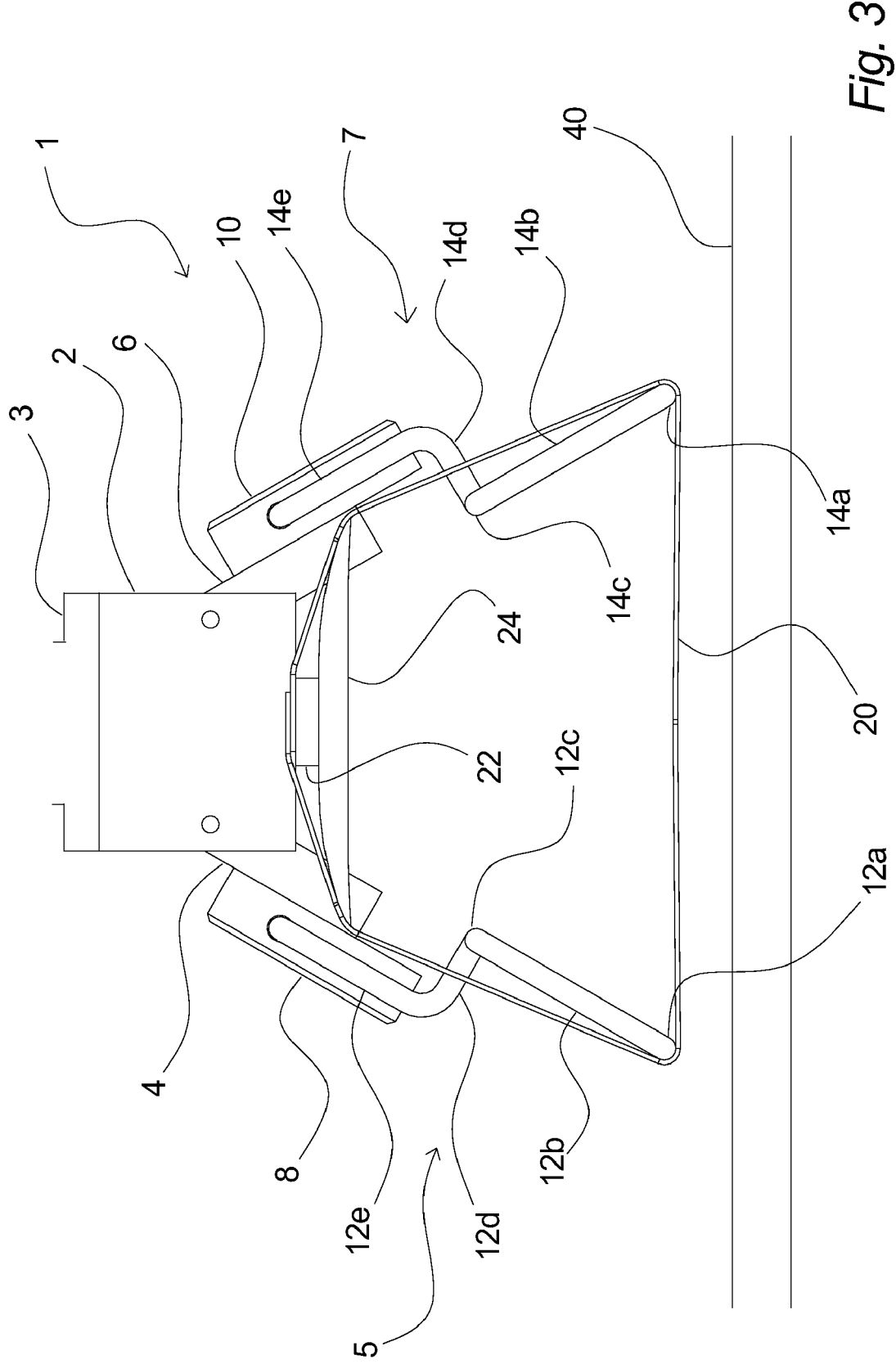
Figure 4:
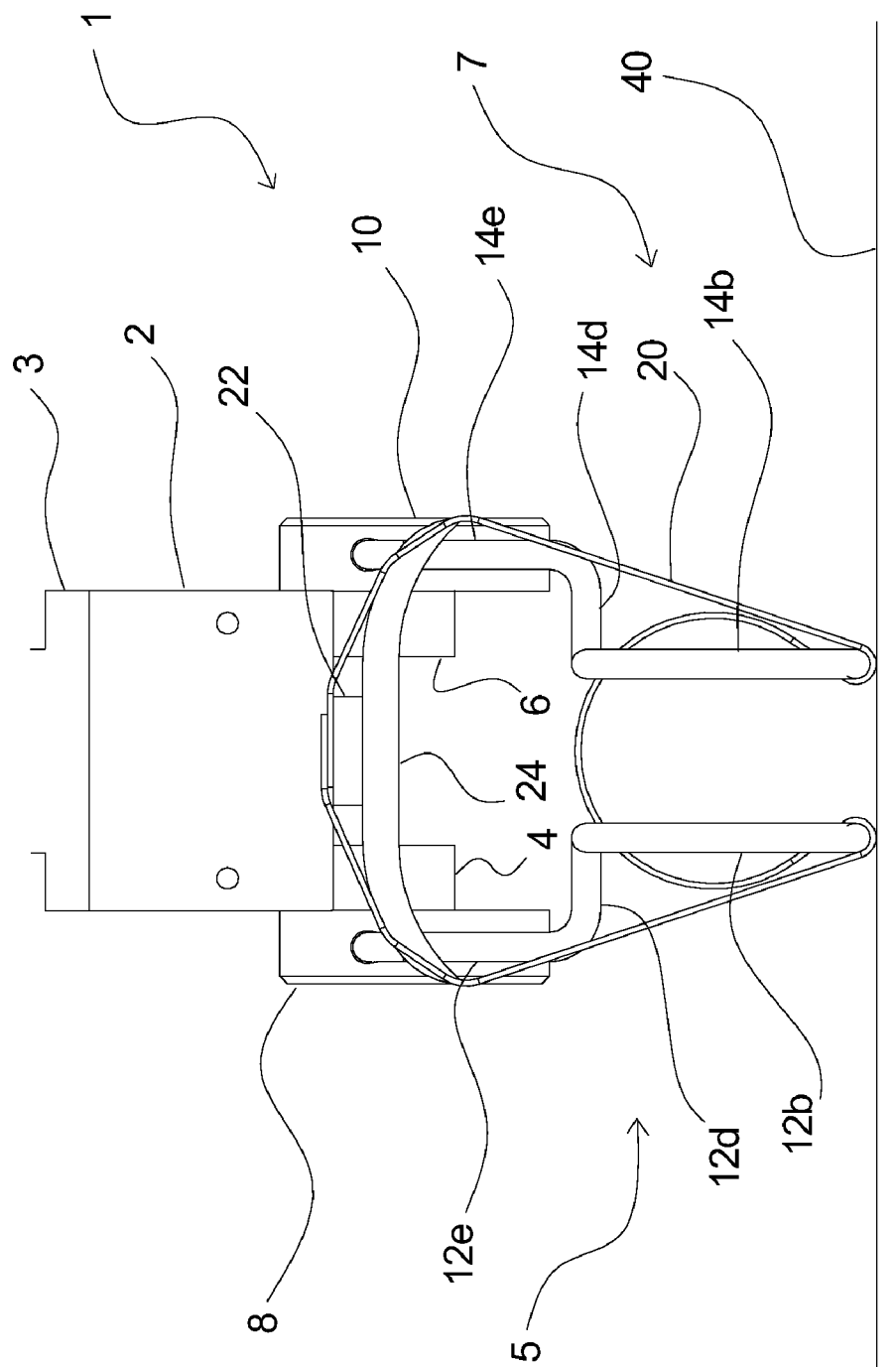
Figure 5:
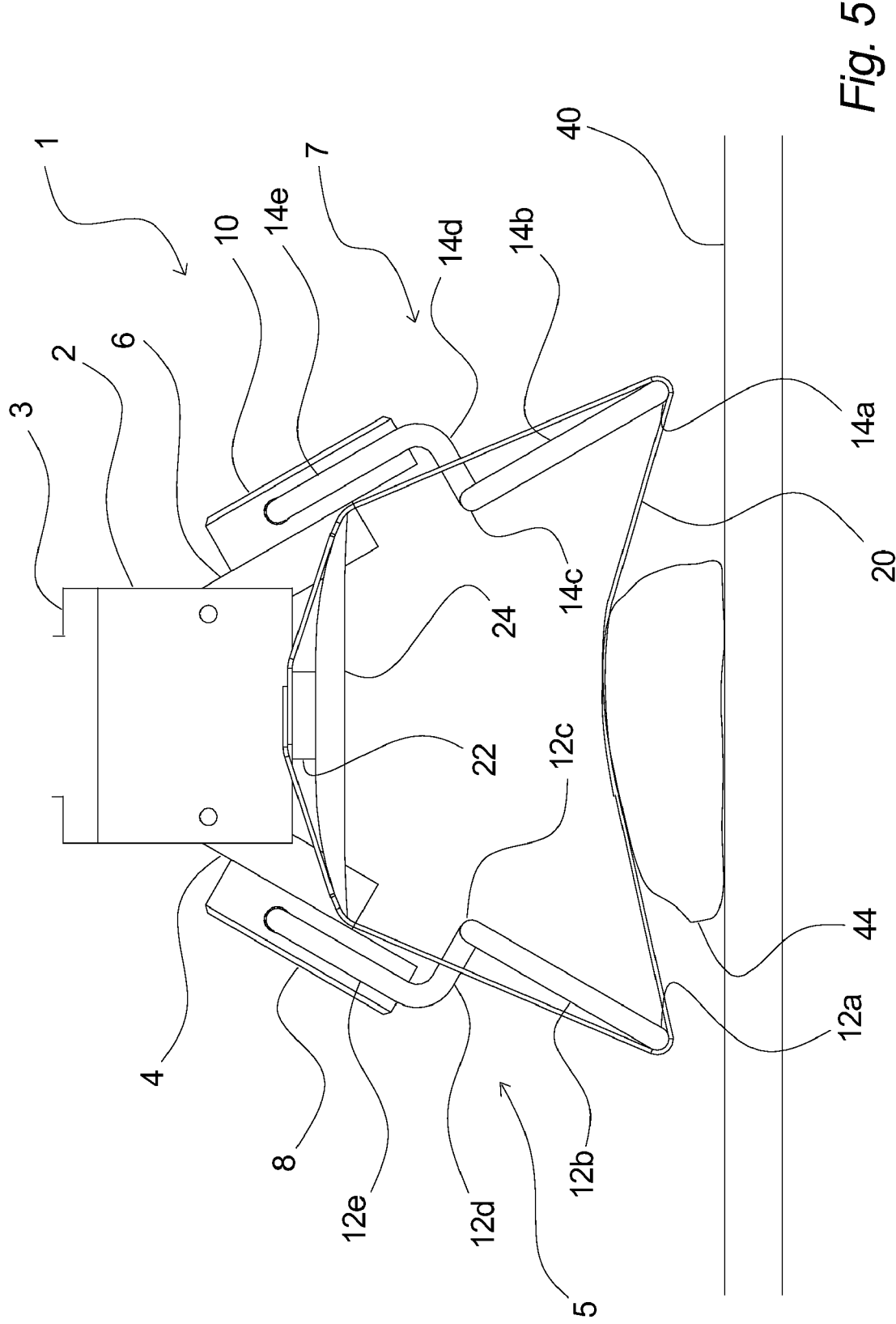
Figure 6:
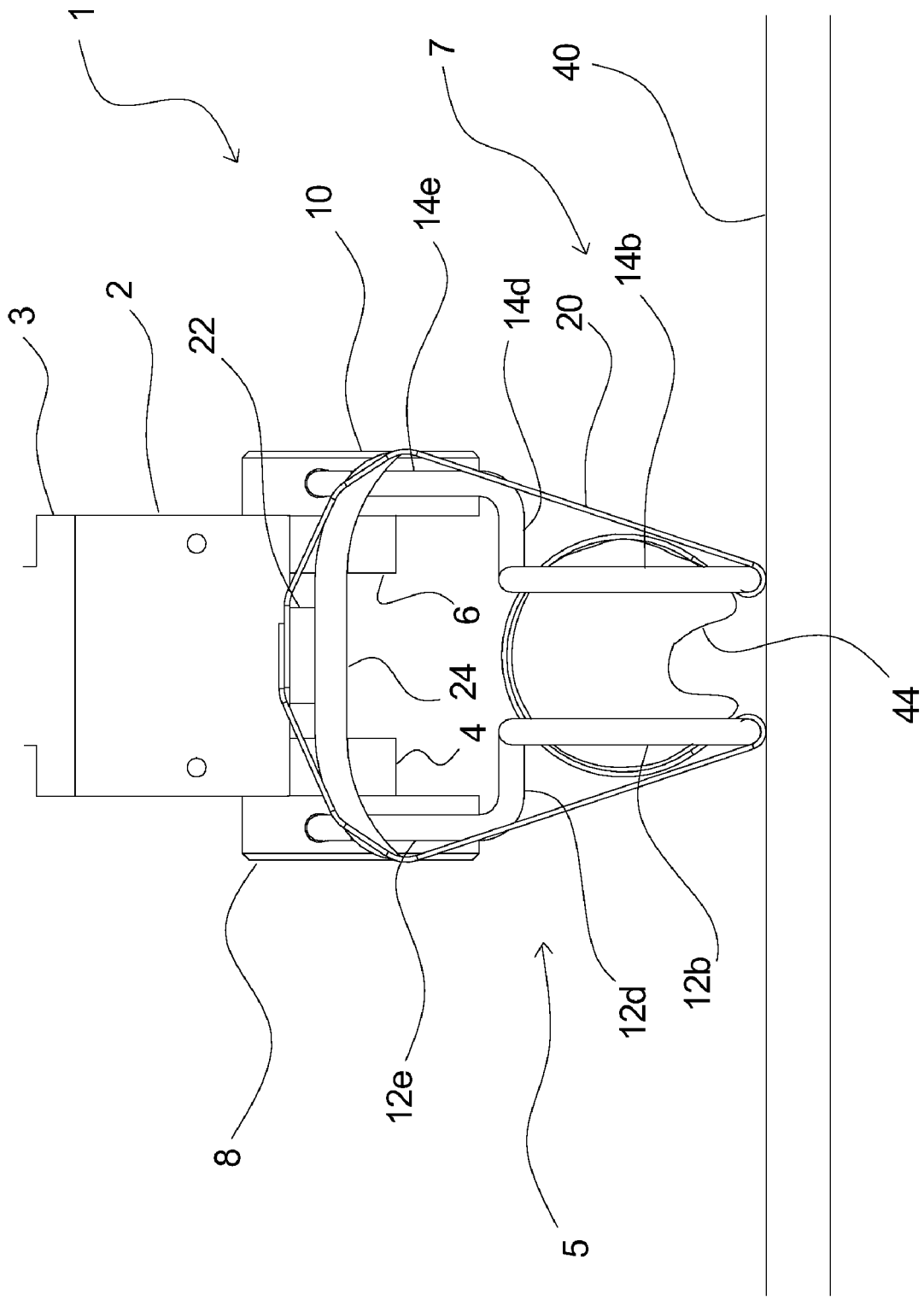
Figure 9:
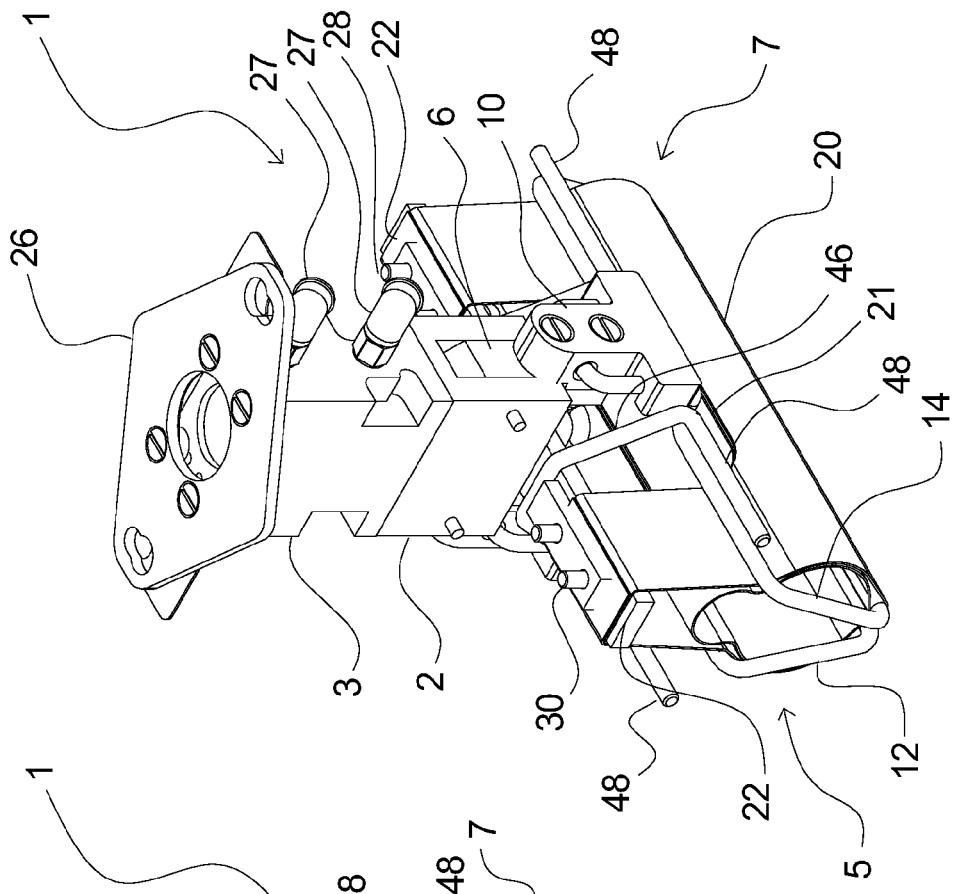
Figure 10:
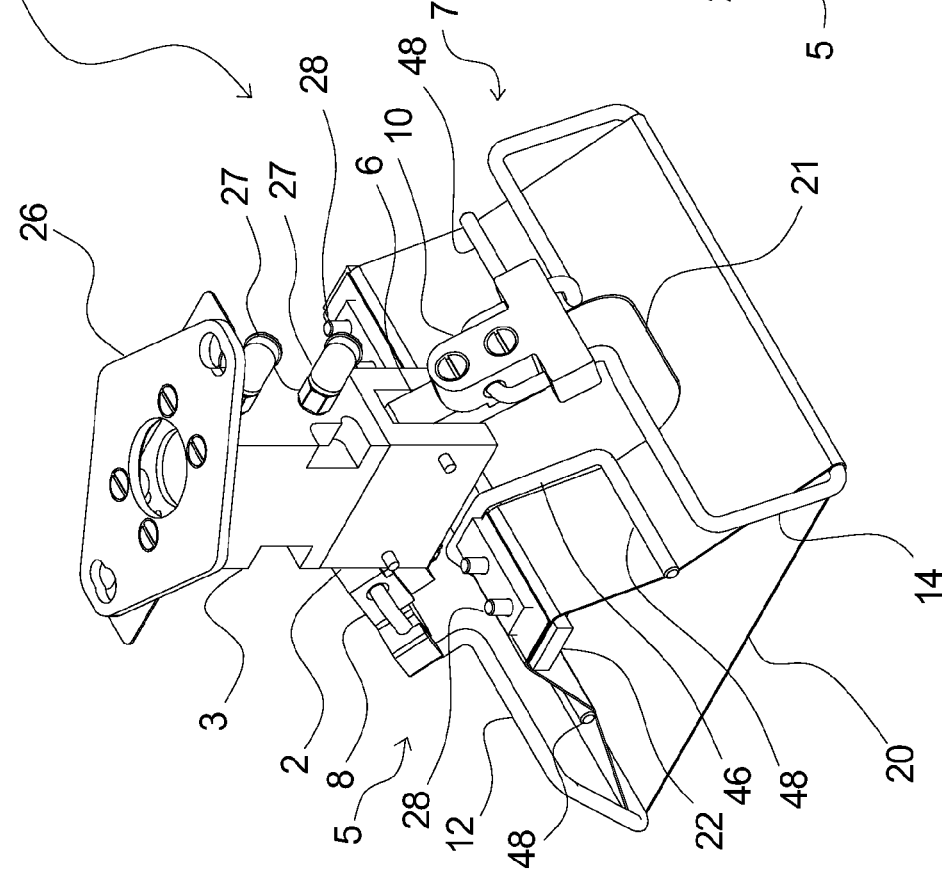

The invention will be further described in the following with references to the drawings, where FIG. 1 shows a perspective view of a gripping device according to an embodiment of the invention, FIG. 2 shows the gripping device shown in FIG. 1, but in a position corresponding to the article being picked up, FIG. 3 shows an end view of the gripping device shown in FIG. 1, FIG. 4 shows the gripping device in FIG. 3, but in a position corresponding to the article being gripped, FIGS. 5 and 6 show the gripping device as shown in FIGS. 3 and 4 together with an article that is being gripped or picked up, FIG. 7 shows a further embodiment of a gripping device according to the invention in an end view with the gripping parts moved away from each other and the gripping belt spread out, FIG. 8 shows the gripping device shown in FIG. 7, but in a position corresponding to an article having been gripped, FIG. 9 shows in a perspective view the gripping device according to this further embodiment in the position shown in FIG. 7, and FIG. 10 shows correspondingly in a perspective view the gripping device according to this further embodiment in the position shown in FIG. 8.

DETAILED DESCRIPTION

In FIG. 1 there is shown a gripping device 1 according to an embodiment of the invention, wherein the gripping device 1 is shown positioned over a carrier material for articles such as a conveyor 40. It should be understood that the gripping device 1 is mounted on a robot (not shown) by means of a mounting and actuator element 3, which carries, is connected to or is a part of a basis element 2 of the gripping device 1. This basis element 2 carries two gripping parts generally designated 5 and 7. Each of these gripping parts 5 and 7 comprises a gripping arm 4 and 6 as shown, which are pivotally carried on the basis element 2 in such a manner that they can pivot from one position which may be substantially vertical or inclined in the position of the gripping device 1 shown in FIG. 1 to a position, wherein they are pivoted in a lateral angle, for example up to 180°, however depending on length, etc. of the gripping belt 20, which will be described later, and vice versa. It should be clear that only one of the gripping arms 4 or 6 can be arranged to pivot, but preferably both will be pivotally. The gripping arm (s) 4 and 6 can be moved by means of one or more actuators, which are not shown in FIG. 1, but which can be comprised in the mounting and actuator element 3 and/or in the basis element 2. This or these actuators can be driven by means of pneumatics, for example by means of an air cylinder, or this or these actuators may be driven by electric means, for example by means of an electric motor, a linear actuator, etc., but other means can be used as well as it will be understood by a person skilled in the art.

As mentioned, the gripping device is mounted on a robot, and it should be understood that the gripping device thereby can be moved with respect to the conveyor 40, for example up and down and sideward, and further the gripping device 1 can pivot around one or more axes, including for example an axis, which can be described as being substantially vertical in the view shown in FIG. 1.

On each of the two gripping arms 4 and 6 there is mounted an adaptor 8 and 10, respectively, the purpose of which is to connect each of two gripping clamps 12 and 14, respectively, to the gripping arms 4 and 6. These two gripping clamps are formed so that—as shown for the clamp 14—there is arranged a lower part 14a, which in the position of the gripping device 1 shown in FIG. 1 would be substantially parallel with the surface of the conveyor 40. At each end the clamp has a part 14b, extending upwards and to a part 14c, which extends towards and near the centre, wherein it via a part 14d leads to a mounting part 14e, which at its end may have a mounting pin (not shown), for example a part, which is bended perpendicular to the part 14e. The mounting part 14e can be mounted in a recess in the adaptor 10 as illustrated so that the gripping clamp 14 is rigorously connected to the gripping arm 6 via the adaptor 10, the not shown mounting pin for example being capable of engaging with a corresponding hole or similar (not shown) so that the gripping clamp 14 is locked with respect to the adaptor 10. As it is shown, the gripping clamps 12 and 14 are primarily formed symmetrically around a centre line. Further, the gripping clamps 12 and 14 are preferably formed resiliently so that they can be mounted and dismounted by pressing the two mounting parts, for example 14e, from each other. The resilient form of the gripping clamps 12 and 14 can also be used in connection with the control of the gripping belt 20, which will be explained later, just as the resilient or flexible form affects an increased robustness.

Further, the gripping device 1 exhibits a longitudinal mounting slat 22 connected to the basis element 2. Furthermore, resilient means 24 of the gripping device 1, for example leaf springs or similar means are for example placed on each end of the gripping device 1, for example connected to the mounting slat 22.

Finally, the gripping device 1 exhibits a gripping belt 20—or a flexible sheath—or belt-shaped material, which it is also designated—, which is substantially formed so that it is located around the two gripping clamps 12 and 14, so that a part of the gripping belt 20 extends between the two lower parts of the gripping clamps 12 and 14, for example 14a. In this part there can be formed holes 32 in the material, as explained later.

As shown, the gripping belt 20 can be connected at its ends to the mounting slat 22 by means of mounting means 28 and 30, which mounting means may also serve as locking means, and recesses 21 in the belt 20 may substantially correspond to the gripping arms 4 and 6 and the adaptors 8 and 10. As shown, said spring elements 24 will imply the gripping belt 20 to spread.

The gripping belt 20, which as mentioned above is also designated a flexible sheath- or belt-shaped material, can be formed in a suitable sheath material, for example a synthetic material normally used within the food industry, but other materials than sheath-formed materials, such as a plurality of parallel bands or flexible laces, strings, chain belts or the like may be used. Further, the gripping belt 20 can be formed so that it is elastic as such, for example by being formed in a material exhibiting elastic properties. As explained above the gripping belt 20 may constitute an element, the ends of which meet on the mounting slat 22, but the gripping belt can also be formed as an endless belt mounted on the gripping device, for example by applying it from below and/or from one end of the gripping device 1, in which case there also can be mounting means 28 and 30 for fixing the gripping belt 20.

The gripping device 1 and the gripping belt 20 are arranged so that the gripping belt is demountable which can be utilized in relation with for example cleaning of the gripping belt, for example by replacing a gripping belt with a clean gripping belt when the gripping belt has been used for a predetermined period of time or for a predetermined number of articles. The ability to demount the gripping belt can also be utilized in other aspects as the gripping belt 20 can be formed in different sizes and/or types, for example with different lengths, widths, thicknesses, types of surface, different sizes of the holes 32 and/or different patterns of holes, different nature of materials, etc. so that the gripping band 20 can be replaced for another type and/or size depending on the sort of article, shape and/or size.

In FIG. 2 a gripping device 1 is shown in a similar manner as in FIG. 1, but in a situation wherein the gripping arms 4 and 6 and thereby also the gripping clamps 14 and 16 are moved towards each other so that an article (not shown) is gripped between the gripping clamps 14 and 16. As it is seen the article will be enveloped or enwrapped by the gripping belt 20, at least over a substantial part of the upper surface of the article. Further, it should be understood that the article will be partly formed to assume a shape corresponding to that of the part of the gripping belt 20 extending between the lower parts 12a and 14a of the gripping clamps 12 and 14 because of the controlling effect of the gripping belt.

In FIG. 3 a gripping device 1 is shown in an end view but in a position corresponding to that shown in FIG. 1 wherein the lower part of the gripping belt 20 is positioned in a certain height above the conveyor belt 40, and above an article (not shown), which it is intended to grip. In this position the gripping arms 4 are 6 moved towards each other, whereby the lower parts 12a and 14a of the gripping clamps 12 and 14 will move in a circular movement so that they approach the conveyor belt 40, but so that they contact the edges of the article which are gradually squeezed together, while the gripping belt covers the article. Because of the circular movement of the lower parts 12a and 14a the gripping device 1 could suitably start moving upwards at a time during this circular movement so that the lower parts 12a and 14a will move substantially parallel with the surface of the conveyor belt 40. In this connection it should be noted that a possible contact between the conveyer belt 40 and the lower parts 12a and 14a of the gripping clamps 12 and 14 is mitigated by the gripping clamps 12 and 14 generally being resiliently formed, for example due to the general form and the resilient effect which is obtained by the parts 12d and 14d that intercept the linear connection between the lower parts 12a and 14a and the mounting parts 12e and 14e, respectively. Further, the construction in thread- or rod-formed materials also contributes to the resilient properties of the gripping clamps.

In FIG. 4 the gripping device 1 is also shown in an end view corresponding to FIG. 3, but in a position corresponding to that shown in FIG. 2, wherein a not shown article is gripped by the gripping device 1. As mentioned above, an upward movement can be started, while the gripping clamps 12 and 14 are moved towards each other so that the movement downwards by the lower parts of the gripping clamps is counteracted by the upward-going movement of the gripping device and as shown in FIG. 4, where the article is gripped, the lower parts of the gripping clamps will be just at a height corresponding to the surface of the conveyor belt 40.

Further, it is seen in FIG. 4 and FIG. 2 that the end-parts 12b and 14b of the gripping clamps 12 and 14 in the closed position will ensure that a gripped article is secured against moving out of the gripping device 1 in the longitudinal direction, for which there could otherwise be a risk if the gripping device 1 is pivoted relatively fast by the robot around for example a vertical axis.

Above, it has been mentioned that the resilient parts 24 serve to hold the gripping belt 20 extended or spread out, and as it is seen in FIGS. 3 and 4, there is a need for controlling the gripping belt 20 during the movements of the gripping clamps. A part of the gripping belt 20 will enwrap around the article, as the article is gripped, but additionally there is a need to resume or adapt to changes in form and/or in length, which as mentioned can be accomplished by means of the resilient parts 24. Instead of and/or simultaneously with this the resilient effect can be carried out by the gripping clamps 12 and 14, by the actuator itself, which moves the gripping arms 4 and 6, and for example can be a pneumatic cylinder, wherein the resilient effect of the air can be utilized, and/or by the gripping belt 20 itself, which can be formed in an elastic material so that (a part of) the necessary changes in the effective length can be provided by the belt itself.

When the gripping device 1 has been moved to a location where it is intended to place the article, and an orientation has been carried out corresponding to that intended, the article can be released and placed by moving the gripping arms 4 and 6 away from each other whereby the movement of the lower parts of the gripping clamps 12a and 14a will result in the gripping belt 20 between these parts will be moved to an extended position. Hereby, the gripping belt 20 will move away from the article from each side, the middle part of the belt being the last part loosing contact with the article. Thereby, the contact between the belt and the article is easily ended even if the article exhibits a sticky surface, and the article will be actively moved or pushed away from the gripping device 1 and will be affected by a force towards the intended position. As mentioned previously the gripping belt 20 can be provided with holes 32, slits, perforations or similar, which also contribute to terminate the contact between the belt and the article as it is released.

Finally, it should be noted that the article as previously mentioned will be partly affected to assume a form corresponding to that part of the gripping belt 20, which is located between the lower parts 12a and 14a of the gripping clamps 12 and 14, in particular when concerned with articles having a certain nature and susceptibility, as for example meat pieces. This form is substantially maintained, when the article is released, which is a substantial advantage, since in general it is intended to provide such a form to meat pieces as they are placed on for example trays used for consumer goods, for consumer display, etc. By means of the invention for example meat pieces can be placed by a robot directly on a package tray and become packed, without need for changing the position of the individual pieces. Thereby considerable labour saving is achieved.

FIG. 5 corresponds to FIG. 3, but in FIG. 5 an article 44 is shown, which is positioned on the conveyor belt 40, and where the gripping device 1 is taken down towards the article 44 so that the gripping belt 20 has begun adapting to the article 44 as also explained above.

In FIG. 6 similarly the gripping device 1 is shown in the same way as in FIG. 4, but where the article 44 is gripped and formed by the gripping belt 20 as also explained above.

A further embodiment of the invention is shown in FIGS. 7-10 where a gripping device 1 according to this embodiment is shown in FIGS. 7 and 8 in end views and in FIGS. 9 and 10 in perspective views. In FIGS. 7 and 9 the gripping device is shown with the gripping arms 12 and 14 and thus also the gripping clamps 12 and 14 moved away from each other with the gripping belt 20 extended, for example in a position where it is ready to grip an article (not shown) on the conveyor belt 40 (FIG. 7). In FIGS. 8 and 10 the gripping device is correspondingly shown with the gripping arms 12 and 14 and thus also the gripping clamps 12 and 14 moved together, e.g. corresponding to a position, where an article (not shown) has been gripped and has been enwrapped by the gripping belt 20.

The embodiment of the gripping device 1 shown in FIGS. 7-10 corresponds essentially to the embodiments illustrated in FIGS. 1-6, but instead of resilient means 24, e.g. leaf springs placed on the mounting slat 22, a bracket 46 has been positioned on each end of the gripping device 1. This bracket 46 has an essentially horizontal rod 48 on each side of the gripping device 1, which is positioned in such a manner that it contacts the gripping belt 20 at certain positions, for example as shown in FIGS. 7 and 9, thereby taking up the slack of the gripping belt 20 at these positions. It is apparent, though, that also resilient means as described above may be used in connection with such brackets for achieving a desired control of the gripping belt 20. The brackets 46 may be integrated with the mounting means 28, 30 for withholding and locking the gripping belt 20 to the gripping device 1.

As mentioned, the gripping device 1 shown in FIGS. 7-10 is—apart from the use of the brackets 46—substantially similar to the previously described embodiments and can be operated in a similar manner as described above. Thus, elements such as the gripping arms 4 and 6, the gripping clamps 12 and 14, the adaptors 8 and 10, the mounting slat 22 and the gripping belt 20 will not be described in detail here. However, it is noted that a recess in the adaptor 8 or 10 for fixing the gripping clamp 12 or 14 is located in another manner than for the adaptor shown in previous embodiments, although still allowing an easy mounting and/or exchange of gripping clamps. Further, FIGS. 7-10 discloses a mounting plate 26 on top of the mounting and actuator element 3 and connection means 27 for facilitating connection to power means, such as pneumatic means, are also shown in FIGS. 7-10.

In the foregoing, different embodiments of the invention have been described with reference to the drawings, but it is apparent for a person skilled in the art that the invention can be carried out in an infinite number of ways and within a wide range of variations within the scope of the appended claims.

LIST OF REFERENCES

1 Gripping device
2 Basis element
3 Mounting and actuator element
4, 6 Gripping arm
5, 7 Gripping parts
8, 10 Adaptor
12, 14 Gripping clamp
12*a*, 14*a* Lower part of gripping clamps
12*b*, 14*b* Upward extending part of gripping clamps
12*c*, 14*c* Inward extending part of gripping clamps
12*d*, 14*d* Part of gripping clamps leading to mounting part
12*e*, 14*e* Mounting part of gripping clamps
20 Gripping belt or similar gripping means
21 Recess in gripping belt
22 Mounting slat
24 Resilient means or spring means
26 Mounting plate
27 Connection means
28, 30 Mounting means
32 Holes in gripping belt
40 Conveyor
44 Article, for example food article
46 Bracket
48 Horizontal rod.

What is claimed is:

1. A gripping device for gripping a food article, wherein said food article is susceptible to assume a form change, affected by the gripping device, and which food article is located on a transport carrier or conveyor, said gripping device comprising
    a base part,
    at least two gripping arms carried by said base part, wherein at least one of said at least two gripping arms is pivotally suspended on said base part,
    at least two gripping clamps, wherein each gripping clamp is carried by a respective gripping arm, and
    a flexible belt-shaped material,
    wherein
    the flexible belt-shaped material is either arranged as an endless part, which is mounted on the gripping device, or is arranged with two ends, which are both mounted on the gripping device, wherein
    the flexible belt-shaped material extends at least between lower parts of said at least two gripping clamps,
    the flexible belt-shaped material is adaptable to size and shape of the food article,
    the food article, when gripped, is at least partly formed by the flexible belt-shaped material, and
    wherein the gripping device comprises a resilient part, which affect the flexible belt-shaped material for controlling the flexible belt-shaped material during movements of the gripping clamps.

2. A gripping device according to claim 1, wherein both said at least two gripping arms are pivotally suspended on said base part.

3. A gripping device according to claim 1, wherein said flexible belt-shaped material extends between the lower parts of said at least two gripping clamps, passes underneath said lower parts of said at least two gripping clamps and extends upwards from said lower parts to be connected to the gripping device.

4. A gripping device according to claim 1, wherein a gripping arm comprises an adaptor, which adaptor is arranged to carry said gripping clamp.

5. A gripping device according to claim 1, wherein said gripping clamp comprises mounting parts arranged to engage with a gripping arm or engage with an adaptor mounted thereon, said mounting parts being resilient.

6. A gripping device according to claim 1, wherein said flexible belt-shaped material is adapted to be mounted on the gripping device and fixed on a mounting slat.

7. A gripping device according to claim 6, wherein said flexible belt-shaped material is configured to be fixed on the gripping device by means of releasable mounting means.

8. A gripping device according claim 6, wherein said flexible belt-shaped material is configured to be mounted on the gripping device substantially in the form of a U-shape with the lower part of which extending between the lower parts of said at least two gripping clamps.

9. A gripping device according to claim 1, wherein said resilient part for affecting the flexible belt-shaped material is selected from the group consisting of a leaf spring, said gripping clamp comprising resilient properties, an actuator arranged to move said gripping parts, the flexible belt-shaped material having inherent resilient properties and any combinations hereof.

10. A gripping device according to claim 1, wherein the gripping device comprises fixed means for affecting the flexible belt-shaped material, said fixed means being adapted for interacting with the flexible belt-shaped material.

11. A gripping device according to claim 1, wherein said flexible belt-shaped material is formed with one or more recesses substantially corresponding to the position of gripping arms and optional adaptors.

12. A gripping device according to claim 1, wherein said flexible belt-shaped material is formed with holes.

13. A gripping device according to claim 12, wherein said holes comprised in the flexible belt-shaped material are uniformly distributed at least in a part of the region of the material which extends between said lower parts of said gripping clamps.

14. A gripping device according to claim 1, wherein at least two gripping arms are arranged on at least one side of the gripping device.

15. A gripping device according to claim 1, wherein the gripping device and said flexible belt-shaped material are formed so that said flexible belt-shaped material is replaceable, and where different sizes or types of said belt-shaped material can be used.

16. A gripping device according to claim 1, wherein the gripping clamps comprise parts which maintain a gripped article in the longitudinal directions.

17. A gripping device for gripping a food article, wherein said food article is located on a transport carrier or conveyor, said gripping device comprising
- at least two gripping parts, which are pivotally suspended with respect to each other, and
- a flexible belt-shaped material, extending at least between lower parts of said at least two gripping parts,
- wherein at least one of said gripping parts is pivotally suspended and comprises a gripping arm and a gripping clamp,
- wherein said gripping arm carries said gripping clamp, wherein said gripping clamp:
  - is a lower part of said at least one gripping part,
    - is configured with a lower part adapted for being placed substantially parallel with a surface of the transport carrier or conveyor, and
    - comprises a flexible structure or material,
- and wherein
- said flexible belt-shaped material extends between the lower parts of said at least two gripping parts, passes underneath said lower parts of said at least two gripping parts and extends upwards from said lower parts to be connected to the gripping device,
- wherein the gripping device
- a) is carried towards a selected article carried on a conveyor belt,
- b) is lowered down towards the article while the gripping parts during at least part of this movement are moved apart so that the flexible belt-shaped material is substantially spread out,
- c) the gripping parts are starting to be moved towards each other while being lowered down, or after having been lowered down,
- d) the gripping device is lifted upwards with the gripping parts moved together with the flexible belt-shaped material having gripped around the article,
- e) the gripping device is carried to a selected location for delivering the article, and
- f) the gripping parts are starting being moved from each other whereby the grip around the article is released and whereby the flexible belt-shaped material is starting being extended or stretched out between the gripping parts so that the article is affected in a direction away from the gripping device.

18. A method of using a gripping device according to claim 1 wherein the gripping device
- a) is carried towards a selected food article carried on a conveyor belt,
- b) is lowered down towards the food article while the gripping arms during at least part of this movement are moved apart so that the flexible belt-shaped material is substantially spread out,
- c) the gripping arms are starting to be moved towards each other while being lowered down, or after having been lowered down, whereby the flexible belt-shaped material is enwrapping a part of the food article so that the form of the food article is partially affected thereby,
- d) the gripping device is lifted upwards with the gripping arms moved together with the flexible belt-shaped material having gripped around the article,
- e) the gripping device is carried to a selected location for delivering the food article, and
- f) the gripping arms are starting being moved from each other whereby the grip around the food article is released and whereby the flexible belt-shaped material is starting being extended or stretched out between the gripping clamps so that the food article is affected in a direction away from the gripping device.

19. A method according to claim 18, wherein, in step (f) the flexible belt-shaped material is gradually released from the food article from each side thereof so that a possible adhesion between the food article and the flexible belt-shaped material is gradually neutralized.

20. A method according to claim 18, wherein step (c) is started while the gripping device is in a substantially stationary height above the conveyor belt or while the gripping device is starting being lifted in relation to the conveyor belt.

* * * * *